United States Patent [19]

Burge et al.

[11] 3,852,506

[45] Dec. 3, 1974

[54] DISPERSIBLE IMPROVED WHEY PROTEIN COMPOSITION AND METHOD

[75] Inventors: Roger M. Burge, Battle Creek, Mich.; Charles W. Groesbeck, Seymour, Conn.; Diane D. Dowd, Madison, Wis.

[73] Assignee: General Foods Corporation, White Plains, N.Y.

[22] Filed: May 21, 1973

[21] Appl. No.: 362,149

[52] U.S. Cl................. 426/453, 426/147, 426/150, 426/187
[51] Int. Cl............................................. A23c 21/00
[58] Field of Search .......... 426/150, 187, 358, 453, 426/147

[56] References Cited
OTHER PUBLICATIONS

Lampert, L. M., "Modern Dairy Products," Chem. Publ. Co., Inc., New York, 1965, p. 276.

*Primary Examiner*—Raymond N. Jones
*Assistant Examiner*—R. A. Yoncoskie

[57] ABSTRACT

The soapy taste of whey protein is rectified by finely grinding spray-dried spheres thereof and then agglomerating the subdivided particles into an agglomerate having a dry porous structure.

1 Claim, No Drawings

DISPERSIBLE IMPROVED WHEY PROTEIN COMPOSITION AND METHOD

BACKGROUND OF THE INVENTION

Dried milk products such as whey develop an objectionable taste and odor. Many associate this odor development as well as an accompanying off-flavor development to a not too well understood oxidative process. Whereas nitrogen packing ammeliorates to some degree the changes that may occur in dry distribution, there is, nevertheless, an eventual objectionable taste and odor development in dry whey protein isolates which handicaps the adaptability of this milk-derived protein to food applications. In view of the wide availability of whey solids and their relatively high protein efficiency a means must be found to offset the organoleptic limitations that have heretofore characterized such dried whey preparations.

Heretofore prior art workers in the dried skim or whole milk arts have practiced processes wherein the milk product is spray dried and ground and agglomerated; this prior art sequence of steps is well known.

STATEMENT OF THE INVENTION

In accordance with the present invention, it has been found that when demineralized and delactosed spray dried whey protein isolates in spherical form are finely ground and then agglomerated there is a remarkable and surprising reduction of objectionable taste and odor characteristics normally associated with dried whey powder. It is estimated in accordance with this invention that the preferred subdivision should achieve a particle size distribution such that at least 55 percent by weight of the subdivided particles have a micron size of less than 44. Collateral to this reduction, foam at the top of a beverage manifested when prior art spray dried whey product is reconstituted, say, from a powdered beverage mix, has been greatly reduced.

The explanation for this sequence of steps having the effects discovered are not understood. It is believed, however, that 6-trans-nonenal which is an oxidative product formed during a spray drying of the whey protein isolate and which can be easily oxidized to nonenoic acid is converted during fine grinding by ozone which serves as a strong oxidizing agent generated during grinding to the less objectionable nonenoic acid which is relatively tasteless and odorless.

The process for demineralizing and delactosing the whey to be processed in accordance with the invention generally comprises:

concentrating the whey by evaporation;

removing part of its lactose by crystallization, allowing the charge to stand overnight, and separating the whey by centrifugation;

removing mono- and di-valent mineral ions from the whey by electrodialysis: i.e., passing the whey through an electrically charged, semiporous cellulose membrane thereby removing calcium, potassium, phosphate, sodium, etc.;

concentrating the whey by further evaporation; and spray drying the demineralized and delactosed whey to a spherical particle which is acid soluble and heat stable.

The invention will now be described by reference to the accompanying operative example of the best mode of practicing it.

Spray dried whey protein spheres isolated as aforesaid are ground in a hammermill through a fine screen, or any similar mill or grinder using hammer- or knife-milling action. Preferably, grinding is effected by using the paddle face rather than the edge portion of the mill blades to promote impact milling.

Typical particle size distributions for two grinds are as follows:

Particle Size of Ground Whey Protein
Percentage Passing Through Sieve

| U.S. Series Sieve No. | Ground Using No. 00 Hammermill Screen | Ground Using No. 3 Hammermill Screen |
|---|---|---|
| 60 | 100.0 | 100.0 |
| 100 | 100.0 | 100.0 |
| 140 | 100.0 | 98.0 |
| 200 | 99.0 | 94.0 |
| 270 | 95.0 | 89.0 |
| 325 | 85.0 | 55.0 |

From the foregoing it will be noted that the screen sizes of the two grinds are very small and are intended to have a high yield of fine subdivided particles. Mechanical subdivisions of the spray dried spheres will liberate gases such as air or gases which are trapped or generated by the spray drying operation per se.

The ground particles may then be dry blended along with other beverage mix ingredients such as buffer salts, sucrose, flavors and coloring. A typical formulation is as follows:

| INGREDIENTS | % BY WEIGHT |
|---|---|
| Partially Demineralized/ Delactosed Whey Particles | 85.2 |
| Partially delactosed whey concentrate for protein fortification | 9.5 |
| Powdered Coffee Lightener Spray dried emulsion of sodium caseinate, coconut oil, emulsifier | 3.5 |
| Flavoring (Coffee) | 1.8 |

The foregoing mixture is then agglomerated in a common steam and/or atomizing agglomerator wherein water, steam or other agglomerating solutions such as a sugar syrup or protein is applied to the mixture. Agglomeration may be effected in a free-falling gravity-induced turbulence agglomerator such as a Blow Knox instantizer or alternatively on any one of a variety of belt or like agglomerators where the material is tumbled and thereafter screened or panned to recover a porous agglomerate. Essentially, the agglomerate produced will be one wherein the subdivided spray dried whey protein particles are maintained in spaced point-to-point contact with one another and may either themselves be bonded to one another or through the intermediation of ancillary beverage mix ingredients so aggregated to provide a porous "instantized" structure which is capable of being readily put into solution by virtue of the increased rate of solubilization achieved through dispersion of the subdivided particle in the more water soluble ingredient of the beverage mix. The agglomerate thus produced is dried, preferably under vacuum, say of less than 100 microns of mercury at a reduced temperature of 120°–140°F for approximately 1½ hours or until a stable moisture content of less than 2 percent is achieved. During this drying operation and throughout the agglomeration operation care is taken to avoid excessive temperature elevation, say, above 160°F, whereby any lactose or other browning reaction precursors are not so treated as to induce onset of undesired flavor constituents.

The agglomerate thus produced is thereafter screened and sized in accordance with commonly accepted practice. The agglomerate is cold milk or water soluble, dispersible and does not foam upon reconstitution and upon storage does not generate an offensive soapy taste.

What is claimed is:

1. A process for making dried whey protein which comprises finely grinding hollow spheres of spray dried demineralized and delactosed whey protein isolates to a particle size wherein at least 55 percent of the subdivided particles have a micron size of less than 44 microns, and thence agglomerating the subdivided particles thereof.

* * * * *